United States Patent

[11] 3,571,762

[72] Inventor Lowell I. Smilen
    Great Neck, N.Y.
[21] Appl. No. 863,864
[22] Filed Oct. 6, 1969
[45] Patented Mar. 23, 1971
[73] Assignee The United States of America as represented by the Secretary of the Air Force

[54] HIGH FREQUENCY DIGITAL DIODE PHASE SHIFTER
4 Claims, 4 Drawing Figs.
[52] U.S. Cl. .................................... 333/10,
    333/84, 317/235, 333/98
[51] Int. Cl. .................................... H01p 5/14
[50] Field of Search .......................... 333/7, 9,
    10, 84m; 317/235—43; 333/6, 31, 84

[56] References Cited
UNITED STATES PATENTS

| | | | |
|---|---|---|---|
| 2,745,060 | 5/1956 | Sferrazza | 333/10X |
| 3,400,342 | 9/1968 | Putnam | 333/10X |
| 3,445,793 | 5/1969 | Biard | 317/235—43 |
| 3,454,906 | 7/1969 | Hyltin et al. | 333/84M |
| 3,458,836 | 7/1969 | Engelbrecht | 333/10X |

*Primary Examiner*—Herman Karl Saalbach
*Assistant Examiner*—Saxfield Chatmon, Jr.
*Attorneys*—Harry A. Herbert, Jr. and Robert Kern Duncan ABSTRACT: A stripline four-port directional coupler having a common input and output port with the other three ports having stripline transmission lines terminated respectively in separate diodes, each of which may be switched independently from a conducting to a nonconducting state by a direct current bias voltage, provides a reflective phase shifter in which the phase of the reflected wave may be made to have eight different values of phase shift, in 45° increments.

PATENTED MAR 23 1971

INVENTOR.
LOWELL I. SMILEN
BY Harry A. Herbert Jr.
Robert Kern Duncan and
ATTORNEYS

HIGH FREQUENCY DIGITAL DIODE PHASE SHIFTER

BACKGROUND OF THE INVENTION

The field of the invention is in electronic phase shifter devices, particularly devices for shifting the phases of the electrical signals fed to radar antennas to electronically direct the radar beam.

Electronic scanning of a radar beam is generally quite desirable as compared to mechanically scanning of the beam by moving the radiating device. Electronic scanning of a radar beam, such as radiated by a multielement Cassegrain antenna, by shifting the phases of the signals delivered to each element is well known. To adequately scan a multielement antenna many signals must rapidly be shifted through many discrete degrees of phase shifts. This has necessitated a very large number of electronic phase shifters, greatly limiting the practicality of such a system. A typical example of a prior art digital phase shifter providing two discrete phase shifts is disclosed by U.S. Pat. No. 3,355,683 issued to Julian Brown, Jr. et al.

SUMMARY OF THE INVENTION

The subject invention is a passive electronic phase shifter for either pulsed or continuous wave operation that is digitally programmed to provide eight different degrees of phase shift in 45° increments.

BRIEF DESCRIPTION OF THE DRAWING

FIG. 3 is a schematic diagram of the embodiment of FIG. 1; and

DESCRIPTION OF THE PREFERRED EMBODIMENTS

Figure 1:
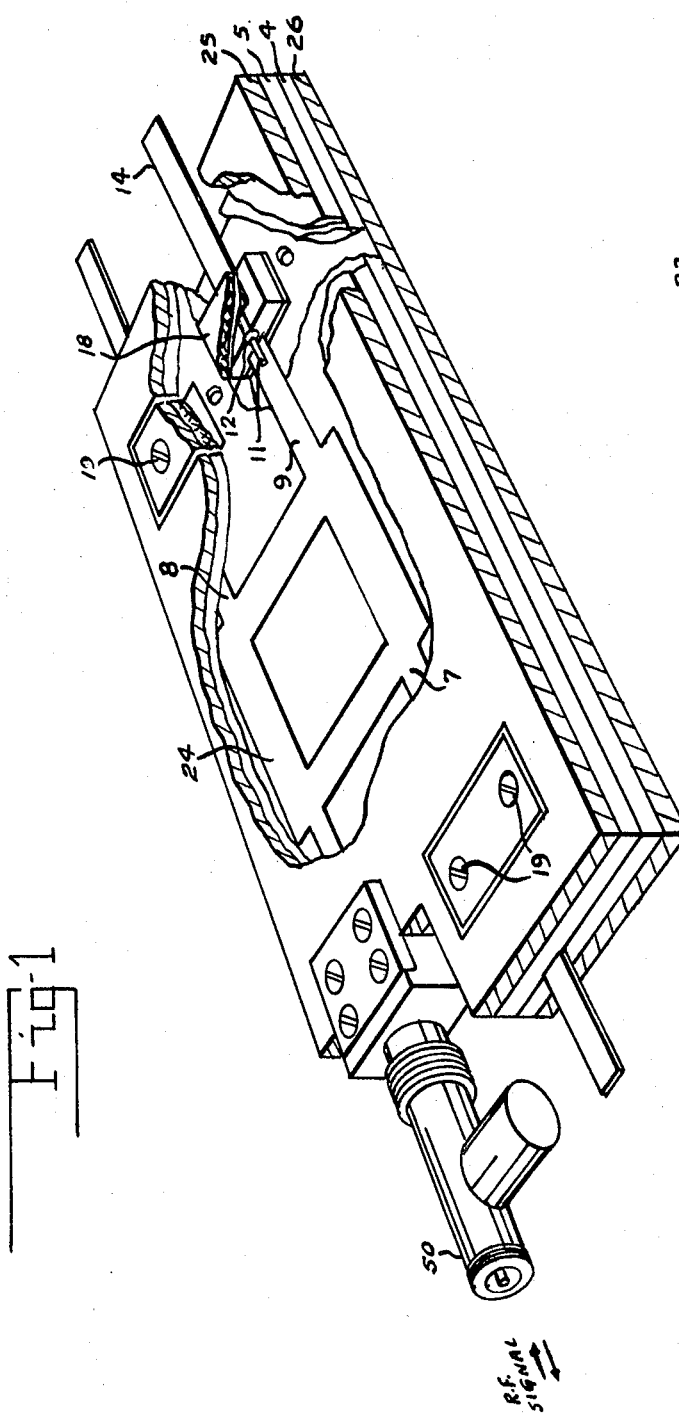
FIG. 1 is a pictorial representation of an embodiment of the invention.

FIG. 1 shows a pictorial representation of an operating embodiment of the invention constructed for frequencies in the L-band of operation. The device is quite conservative of space, the approximately overall dimensions of this embodiment of the device, less the conventional monitor tee DC grounding element 50 and the tabs for the DC bias connections, are 4 inches by 8½inches, by one-half inch. It is essentially a passive device requiring only switching potentials to the diodes. The approximate total radio frequency power loss within the device is approximately 1db. The conventional monitor tee 50 at the signal connection to the device is used to provide a ground return for the diode bias switching voltages.

The fabrication of the electrical circuit is conventional stripline construction, that is, a flat thin electrical signal conductor 24 supported between similar layers of insulation 4 and 5 positioned between ground planes 25 and 26.

The electrical circuit of the device of FIG. 1 is shown in FIG. 3. The four-port stripline coupler 23 is a −4.54db coupler (coupling ratio measured between port I and port III). In this embodiment the coupling ratio of the coupler and the lengths of the transmission lines 7, 8, and 9 are critical to provide the 45° steps in the phase shifts. The effective phase shift created by an open circuit transmission line is expressed by $-j\cot\theta$, and that of a closed (shorted) transmission line by $j\tan\theta$, where $\theta$ is the effective electrical length of the line in degrees. $\theta$ in radians is equal to the phase constant in radians per unit length of the line $\beta$, times the line length $l$, thus:

$$\theta = \beta l = \omega \sqrt{\mu \epsilon} l, \text{ or for}$$

a specific line having a dielectric constant $k$, $$\theta = \omega \sqrt{k\mu_0\epsilon_0} l, \text{ where}$$

$$\omega = 2\pi f, \text{ and}$$

$$\frac{1}{\sqrt{\mu_0\epsilon_0}} = 3(10)^8 \text{ m/sec.}$$

Further simplifying:

$$\theta = 2\pi f \sqrt{k} \times \frac{1}{3} \times 10^{18} l,$$

where $l$ is the physical length of the line in meters. $\theta$ in radians is equal to $\theta$ in degrees ($\theta°$) multiplied by $\pi/180$. In the embodiment of FIG. 1 the dielectric is Tellite having a dielectric constant $k$ of 2.32. Thus for this embodiment the electrical length of the transmission lines in degrees is expressed by $$\theta° = \frac{fl}{.548} (10)^{-6}$$

and for an operating frequency of 1.5 (10)⁹ Hertz the expression for $l$ becomes: $l = 3.65 (10)^{14} \times \theta°$ where $l$ is in meters. Therefore for transmission line 7 connected at port II to have a 45° effective phase characteristic its length at this frequency is 1.64 cm. and line 8 connected at port III for a 61.5° shift has a length 2.24 cm. and line 9 with a shift of 20° has a length of .73 cm.

The programming of the switching of the PIN diodes at the terminations of the transmission lines connected to the ports of the coupler to provide the various increments of phase shifts is shown in the following Table I. A 0 represents the diode open and 1 represents the diode closed, or shorted by the bias voltage.

TABLE I

| Conduction of diodes at terminations of ports | | | Phase of reflected wave-degrees from input wave |
|---|---|---|---|
| Port II | Port III | Port IV | |
| 0 | 0 | 0 | 157.5 |
| 0 | 0 | 1 | −67.5 |
| 0 | 1 | 0 | −112.5 |
| 0 | 1 | 1 | 22.5 |
| 1 | 1 | 0 | −157.5 |
| 1 | 1 | 1 | 67.5 |
| 1 | 0 | 0 | 112.5 |
| 1 | 0 | 1 | −22.5 |

Figure 2:
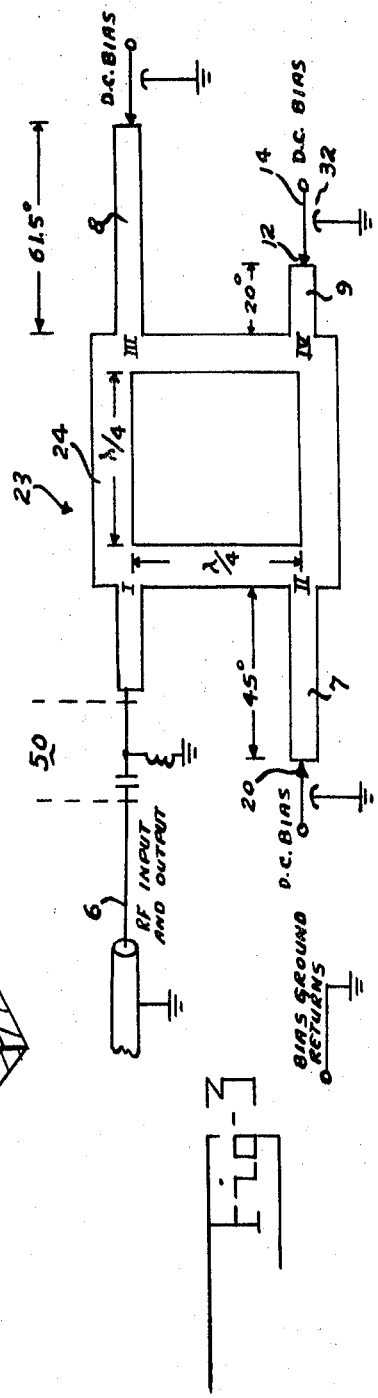
FIG. 2 is a section view showing the construction at a diode termination of FIG. 1.
Figure 2:
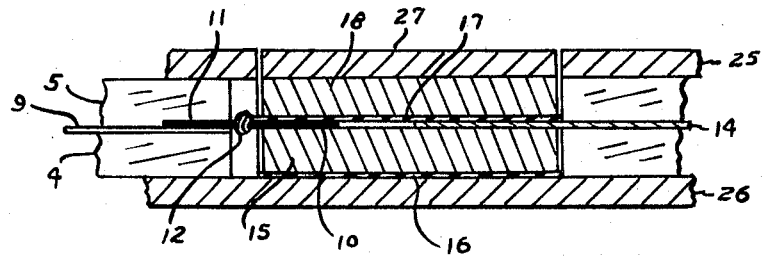

The stripline construction of four-port couplers is well known, as is the general construction stripline transmission lines. Also, the use of diodes as shorting switches controlled by DC bias voltage is well known. The detail of the diode connections to the ends of the stripline is shown for port IV in broken-away form in FIG. 1, and in detail in FIG. 2. The diode terminations at the ends of the transmission lines connected to ports II and III are similarly constructed. PIN type diodes have generally been found to be preferable for this device due to their superior high-frequency characteristics. Referring both to FIGS. 1 and 2; one lead 11 of PIN diode 12 is soldered to the end of the transmission line 9. The other diode lead 10 is clamped (as shown by screws 19 for the other termination access covers) against shorting block 15. It is through shorting block 15 that electrical connection of the diode lead 10 with the DC bias tab connection 14 is made. Insulating sheet 16, which may be Mylar or other suitable insulating material insulates the shorting block 15 from the metallic ground plate 26. Another sheet of insulating material 17 is placed between the upper side of the diode lead 10, DC bias tab 14 and the pressure plate 18. The pressure plate 18 contacts the upper section of ground plate cutout 27 which is made at ground potential through the conductivity of screws 19 which engage the threaded lower ground plate 26. It has been found desirable to make the pressure plate 18 of conductive material similar to the shorting block 15. Gold plated brass has proven very satisfactory. Thus a bypass capacitance 32, FIG. 3, is formed at the back side of the diode between the bias tab 14 and the diode lead 10 and ground. This capacitance while beneficial to the operation of the device, is not critical as to magnitude of capacitance. Other arrangements of providing radio frequency capacitance to ground at the back side of the diode may readily be employed.

Figure 4:
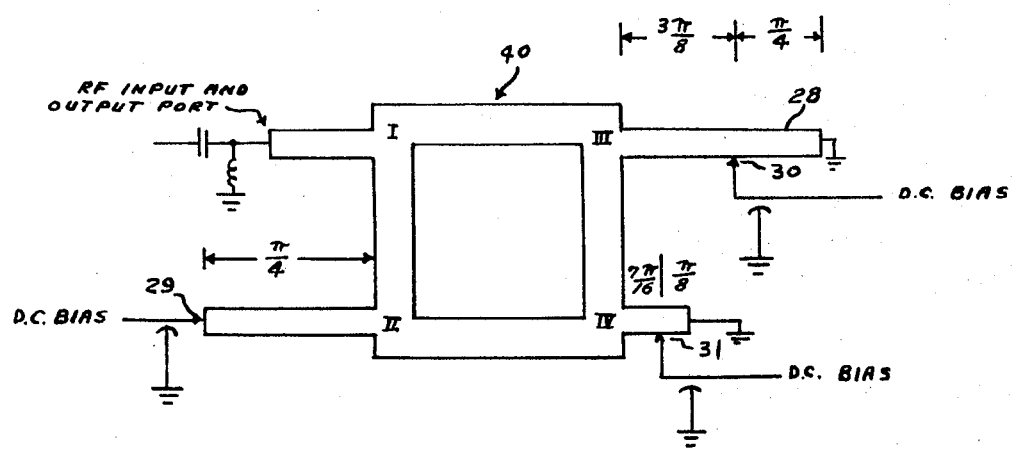
FIG. 4 is a schematic diagram of an embodiment having the diode terminations of ports III and IV prior to the reflective ends of the stripline.

Another embodiment of the device, likewise providing eight increments of phase shift in 45° steps, is shown schematically in FIG. 4. Again the coupler and transmission line lengths are critical. In this embodiment the coupler 40 is a −3.63db coupler. (Coupling ratio expressed between ports I and III). The shorting diodes 30 and 31 instead of being located at the ends of the transmission lines connected to the third and fourth ports of the coupler are connected at critical phase lengths along the lines. Thus considering, for example, the line 28 which has a total electrical length of $5\pi/8$ radians, with the end of the line grounded, the reflection with the diode open is from a shorted line $5\pi/8$ long, and with the diode shorted the line is $3\pi/8$ long.

Table II shows the programming of the diodes of this embodiment to provide the indicated phase shifts.

TABLE II

| Conduction of diodes at terminations of ports | | | Phase of reflected wave-degrees from input wave |
|---|---|---|---|
| Port II | Port III | Port IV | |
| 1 | 1 | 1 | −22.5 |
| 1 | 1 | 0 | −67.5 |
| 1 | 0 | 1 | −112.5 |
| 1 | 0 | 0 | −157.5 |
| 0 | 1 | 1 | 157.5 |
| 0 | 1 | 0 | 112.5 |
| 0 | 0 | 1 | 67.5 |
| 0 | 0 | 0 | 22.5 |

As in the previously described embodiment a DC ground return for the diode switching voltages is provided by a conventional DC grounding monitor tee connected to the input of the device.

I claim:

1. A high frequency, reflective, stripline phase shifter providing eight increments of 45° phase shifts comprising:
   a. a stripline −4.54db four-port coupler having first, second, third, and fourth ports;
   b. a monitor tee providing a direct current ground and common input-output connection;
   c. connecting means, including a first stripline transmission line, cooperating with the monitor tee and the first port of the four-port coupler;
   d. a second stripline transmission line essentially 45 electrical degrees long to the second port of the said coupler;
   e. a third stripline transmission line essentially 61.5 electrical degrees long connected to the third port of the said coupler;
   f. a fourth stripline transmission line essentially 10 electrical degrees long connected to the fourth port of the said coupler; and
   g. switching means cooperating with the said second, third, and fourth stripline transmission lines for independently switching each of the said transmission lines from an open termination to a shorted termination.

2. The apparatus as claimed in claim 1 wherein the said switching means includes a PIN diode.

3. A high frequency, reflective, stripline phase shifter having a signal conductor and a ground plane for selectively providing 8 independent degrees of phase shifts in 45-degree increments comprising: a. a stripline four port −4.54db coupler having a first port, a second port, a third port, and a fourth port;
   b. connecting means cooperating with the first port of the said coupler for providing a common input-output connection to the coupler;
   c. a first stripline transmission line having an electrical length of essentially 45° connected to the second port of the coupler and an open termination;
   d. a second stripline transmission line having an electrical length of essentially 61.5° connected to the third port of the coupler and an open termination;
   e. a third stripline transmission line having an electrical length of essentially 20 degrees connected to the fourth port of the coupler and an open termination;
   f. a first PIN diode connected to the open termination of said first transmission line;
   g. a second PIN diode connected to the open termination of said transmission line;
   h. a third PIN diode connected to the open termination of said third transmission line;
   i. a first direct current bias means connnected to the first PIN diode for selectively switching the said first transmission line from an open to a shorted termination;
   j. a second direct current bias means connected to the second PIN diode for selectively switching the said second transmission line from an open to a shorted termination; and
   k. a third direct current bias means connected to the third PIN diode for selectively switching the said third transmission line from an open to a shorted termination.

4. The phase shifter as claimed in claim 3 wherein the said first, second and third bias means includes respectively a first, a second, and a third capacitance to the said stripline ground plane at the connection of the said respective bias means to the said respective diodes.